July 18, 1967 A. G. SINCLAIR 3,331,669
METHOD AND APPARATUS FOR FORMING MINERAL WOOL PRODUCTS
Filed June 21, 1963 2 Sheets-Sheet 1

INVENTOR.
ALFRED G. SINCLAIR
BY
John A. McKinley
ATTORNEY

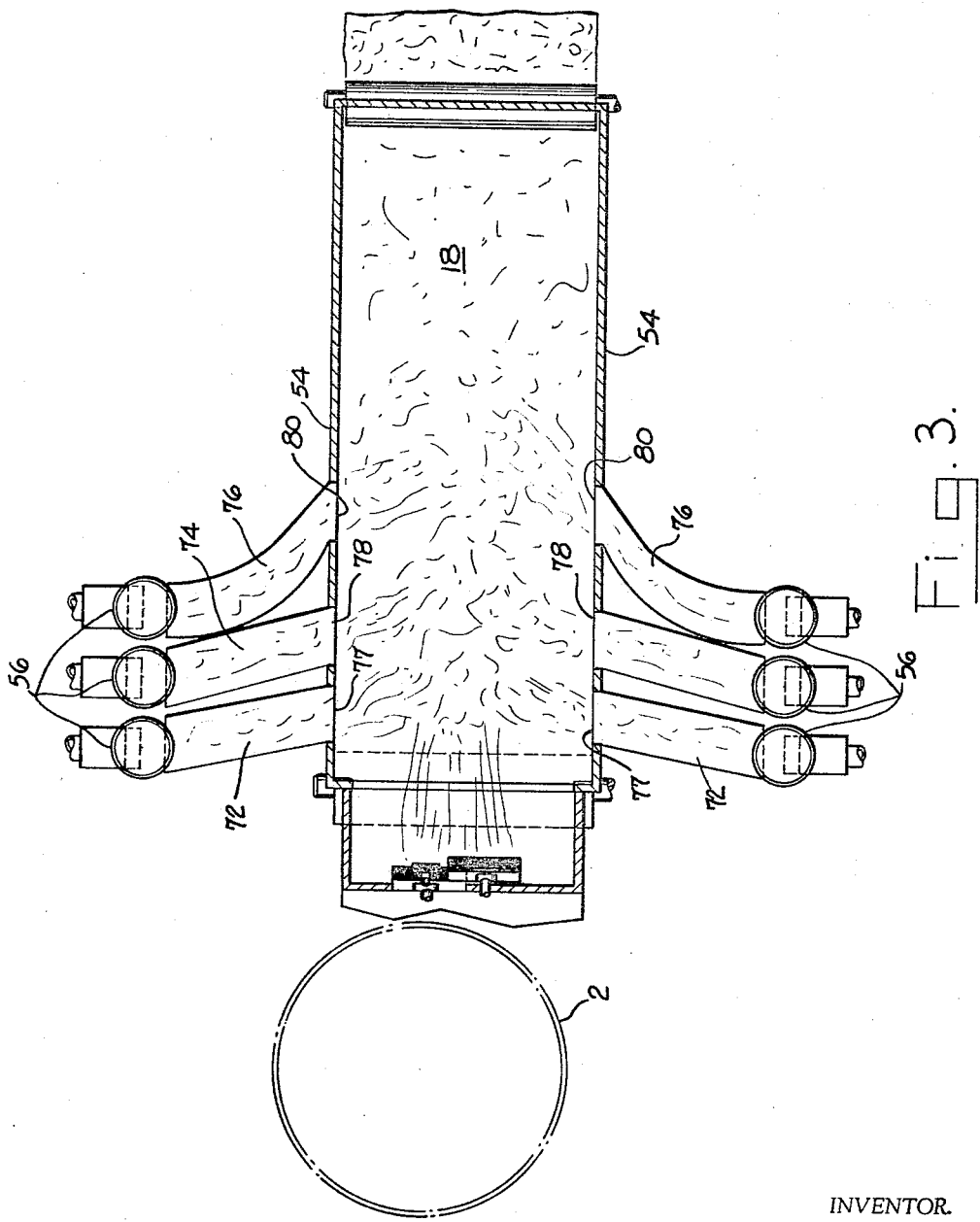

3,331,669
METHOD AND APPARATUS FOR FORMING MINERAL WOOL PRODUCTS
Alfred G. Sinclair, Port Credit, Ontario, Canada, assignor to Johns-Manville Corporation, New York, N.Y., a corporation of New York
Filed June 21, 1963, Ser. No. 289,632
8 Claims. (Cl. 65—4)

The present invention relates to the manufacture of fibrous products and, more specifically, to method and apparatus for the manufacture of products in which mineral wool and glass wool fibers are combined in an intimate and comingled relationship. Also, the invention is directed to the mineral wool product formed from such method and apparatus. The term "mineral wool" as used herein includes wool or fibers formed from rock, slag, mixtures thereof and like raw materials. The term "glass wool" as used herein includes wool or fibers formed from glass or a similar vitreous material.

Insulation products made from mineral wool have very good insulating properties and are in wide commercial use. However, in order to continue to enjoy this commercial success, it is necessary that the cost of getting the mineral wool product to the customer be as low as possible. One of the big factors in the cost of mineral wool products relates to the shipping thereof. Insulation products, such as those made from mineral wool, are packaged for shipping by compressing and inserting them within a shipping unit. When the insulation products are removed from the shipping unit, it is necessary that they regain their original thickness since one criterion for determining their insulating properties is the value obtained by dividing the thickness of the product by its thermal conductivity. The amount of such regain in thickness is in direct comparison with the resiliency of the insulating product. Mineral wool products are formed from mineral wool fibers which normally are not as long as other commercially available fibers, such as glass, and do not have a relatively high degree of resiliency. On the other hand, glass wool products, because of the relative unlimited length of the glass fibers, have a high degree of resiliency. The instant invention improves the resiliency of the mineral wool products by the incorporation of glass fibers therein without damaging the relative length thereof so that greater quantities of mineral wool products in terms of the areas to be covered by such products may be enclosed within the conventional shipping unit.

It is an object of the instant invention to provide a method for the production of mineral wool products containing long glass fibers in intimate and comingled relationship with the mineral wool fibers therein.

It is a further object of the instant invention to provide apparatus for the production of mineral wool products containing long glass fibers in intimate and comingled relationship with the mineral wool fibers therein.

The foregoing objects are accomplished in accordance with the instant invention by incorporating a plurality of glass fiber attenuating units into the apparatus normally utilized in the production of mineral wool products. More specifically, the preferred embodiment of the invention comprises a conventional spinning apparatus including a zone of fiberization and a collection chamber. A plurality of glass fiber attenuating units are located adjacent the side walls of the collection chamber so as to intersperse newly formed glass fibers into the mineral wool fibers in the collection chamber. The commingled mineral wool and glass fibers are then collected on a conveyor belt moving through the collection chamber to form an insulation product having the mineral wool fibers and the glass fibers in intimate and comingled relationship and in which, because of the minimum amount of handling, the mineral wool and glass fibers have a maximum length. The percentage of the glass fibers is small relative to the mineral wool fibers so that the insulation product is essentially a mineral wool product having glass fibers in an intimate and comingled relationship with the mineral wool fibers therein.

The invention will be more fully understood and further objects and advantages thereof will become apparent when reference is made to the following detailed description of a preferred embodiment of the invention and the accompanying drawings in which:

FIG. 3 is a view taken along the lines 3—3 of FIG. 1.

Figure 1:
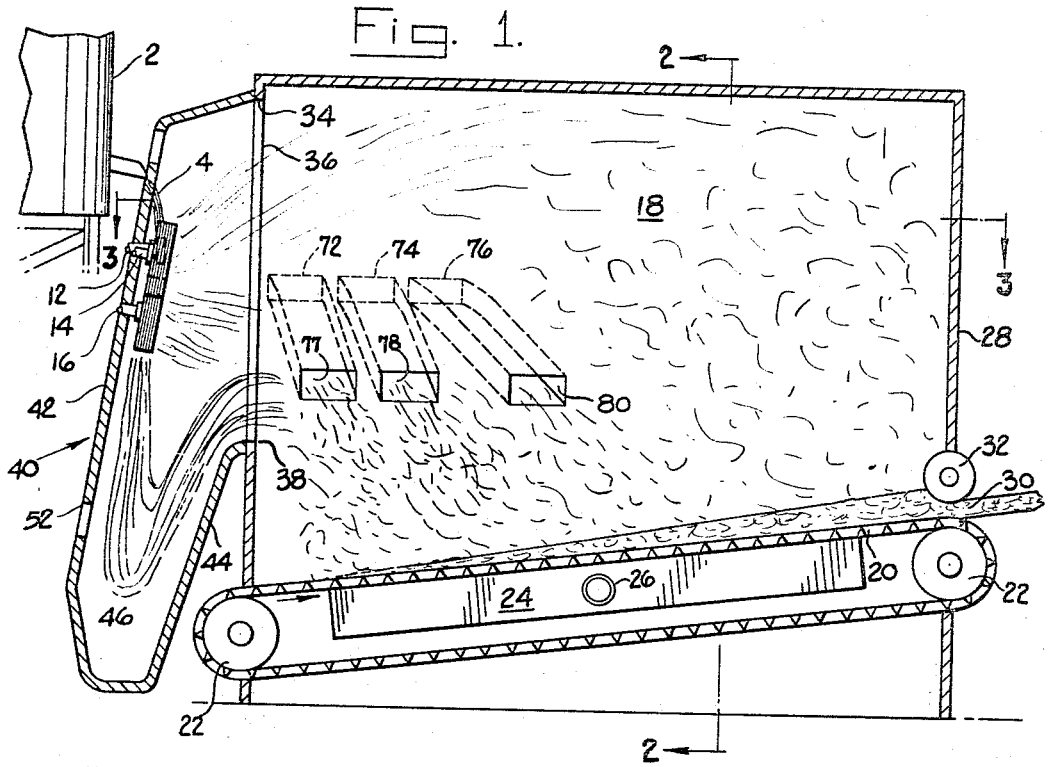
FIG. 1 is a side elevation of apparatus of the instant invention.

Referring to the drawing, there is illustrated a cupola 2 of the type common to the mineral wool industry, adapted to melt and discharge a molten stream 4 of a material capable of being formed into fibers. The material of the stream is converted into fibers by a multispinning apparatus including a distributor roll 6 positioned and rotated so as to intercept the stream on a downturning edge of its periphery and accelerate the particles of the stream. The accelerated particles of the stream 4 are discharged therefrom onto the peripheral surface of a fiberizing rotor 8 rotating in a direction opposite to the direction of rotation of the distributor roll 6. A portion of the material received from roll 6 by rotor 8 is discharged therefrom onto the peripheral surface of a second fiberizing rotor 10 substantially identical to the rotor 8 and rotated in a direction opposite to the direction of rotation of the rotor 8 and in the same direction as the roll 6. The roll 6 and rotors 8 and 10 are rotated by the shafts 12, 14 and 16 suitably connected to a source of power. As is now well-known, molten material is bonded to the peripheral surfaces of the rotors 8 and 10 and when these rotors are rotated at high speed the molten material is thrown therefrom by centrifugal force with the result that fibers are formed in the area closely adjacent the peripheral surfaces of the rotors 8 and 10.

A fiber collection chamber 18 is located adjacent the spinning apparatus. The collection chamber 18, which is relatively air tight except for the openings to be described, includes a bottom wall comprising a foraminous conveyor 20 adapted to be supported on rolls 22 and to be driven in a direction indicated by the arrow by any suitable means (not shown). A suction box 24 is located intermediate the upper and lower reaches of the conveyor 20 with its open side adjacent the upper reach of the conveyor. The suction box 24 is connected to any suitable air-exhausting device (not shown) by means of duct 26.

The forward wall 28 of the collection chamber is provided with an exit port 30 through which the accumulated fibers are delivered by the conveyor to any desired type of rehandling apparatus. Port 30 is preferably defined in part by a roll 32 adapted to compress and consolidate the fibrous insulation product to some extent as it leaves the collection chamber 18. The rear wall of the collection chamber 18 includes an entrance opening 33 opposite the spinning apparatus. This opening is defined by a top edge 34, side edges 36 and a bottom edge or threshold 38.

Figure 2:
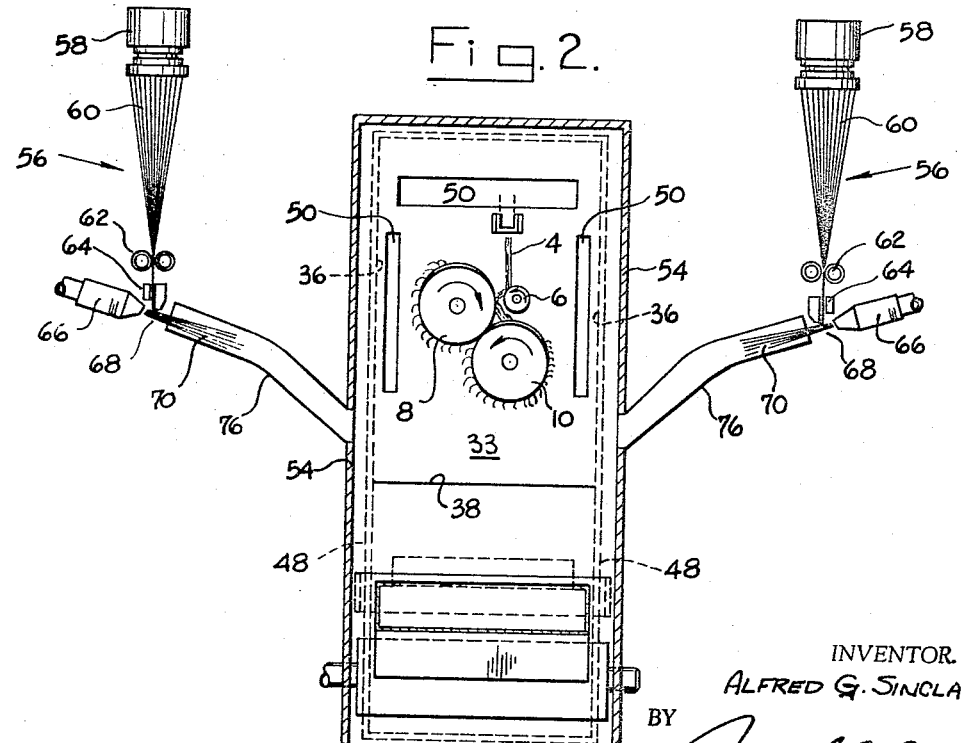
FIG. 2 is a view taken along the lines 2—2 of FIG. 1.

Surrounding entrance 33 and the spinning apparatus is a housing, indicated generally at 40, and including a rear wall 42 lying behind the spinning apparatus and extending upwardly and forwardly to join the rear wall of the collection chamber, and downwardly and rearwardly to a point remote from the spinning apparatus. Also extending downwardly, and preferably rearwardly from the threshold 38, is a front wall 44. Walls 42 and 44 form a pocket 46 in which suitable means may be provided to remove unfiberized particles and shot collected in the pocket. The sides of the housing are closed by side walls of any suitable type, indicated at 48 in FIG. 2.

Rear wall 42 is provided with openings to receive the shafts and other elements of the spinning apparatus and also the means over which the molten stream 4 of material flows from the cupola 2. Rear wall 42 is further provided with air inlets 50 and 52 to coact with the suction box 24 to set up air streams surrounding the spinning apparatus so as to control the movement of the fibers formed by the spinning apparatus and to carry them into the collection chamber 18. Air inlet 52 is located downwardly and rearwardly from the threshold 38 so that the air passing therethrough turns the direction of movement of the fibers coming from the spinning apparatus from their normal path and carries them into the collection chamber 18.

Adjacent each of the side walls 54 of the collection chamber 18 there are located a plurality of glass fiber producing units 56. The glass melting and primary filament drawing section of these units includes the melting pot 58, the bottom of which is provided with a plurality of small openings through which streams of molten glass are exuded for attenuation into primary filaments 60 formed by the action of a pair of pull rolls 62 positioned beneath the melting pot 58. From the pull rolls 62, the primary filaments 60 pass downwardly through suitable guide members 64 into a position adjacent the lip of burner 66 which is adapted to produce a high velocity and high temperature gaseous blast 68. The primary filaments 60 enter the gaseous blast 68 where they are melted by the heat of the blast and attenuated into fine fibers by the velocity of the blast. The formed glass fibers 70 pass through tubes 72, 74 and 76 and openings 77, 78 and 80 in the side walls 54 into the collection chamber 18. Although three glass fiber units 56 adjacent each wall 54 are illustrated herein, it is within the scope of the invention to use more or less than the number shown, depending upon the amount of glass fiber it is desired to be incorporated into the fibrous insulation product collected in the chamber 18. Also, it may be desirable to locate the glass fiber attenuating units so as to feed glass fibers into the collection chamber 18 through either forward wall 28 or rear wall 42.

In the operation of the apparatus described above and in carrying out the method of the invention thereon, molten material is discharged from the cupola 2 onto the peripheral surface of the distributor roll 6 and then to the fiberizing rotors 8 and 10. The rotors are rotated at high speed to cause portions of the molten material to be thrown or drawn off into fibers. The movement of the fibers is controlled by the air currents passing through the air inlet ports 50 and 52. These air currents create aeriform walls which block the movement of the fibers and divert them from their normal paths and lead them into the collection chamber 18. The fibers entering the collection chamber in the aeriform suspension are drawn downwardly by gravity and by the flow of air into the suction box 24 and deposited on the conveyor 20 in the form of an interfelted fibrous insulation product.

The glass fibers formed by attenuating the primary filaments 60 by the heat and velocity of the gaseous blast 68 move through the tubes 72, 74 and 76 through the openings 77, 78 and 80 into the collection chamber 18. The glass fibers passing through the openings 77 and 78 are moving generally in a direction transverse to the general direction of movement of the mineral wool fibers into the collection chamber 18. The glass fibers 72 passing through the opening 80 are moving in a direction that is transverse to the general direction of the movement of the mineral wool fibers into the collection chamber 18 but at the same time these glass fibers move in a direction toward the rear wall 28 of the collection chamber 18. Also, the openings 77, 78 and 80 of the tubes 72, 74 and 76 are located forwardly and upwardly above the threshold 38 so that the glass fibers are intercepted by the aeriform suspensions of mineral wool fiber and move generally with the mineral wool fibers in the collection chamber 18 to be deposited on the conveyor belt 20. In this manner, the fibrous insulation product collected on the conveyor belt 20 comprises primarily a mineral wool product having glass fibers in intimate and co-mingled relationship with the mineral wool fibers therein. The mineral wool product formed in this manner is carried from the collection chamber by the conveyor 20 and may thereafter be subjected to any further operations necessary to convert it into a final product.

The mineral wool products formed in accordance with the instant invention have a variety of uses such as home insulation, refrigerator insulation, stove insulation, pipe insulation and other uses. These mineral wool products may also be referred to as mineral wool batts. These mineral wool products have advantages over the insulation or other products containing only mineral wool fibers. As stated above, the higher resiliency of the glass fibers allows a greater amount of the insulation products made in accordance with the instant invention to be contained in a conventional shipping unit. Also, because of this resiliency and regain value, the density of the insulation product may be reduced over the density of the insulation products containing only mineral wool fibers thus resulting in a lower cost and higher production rates in square feet per hour. Other advantages such as better handleability and increased tensile strength are also associated with the insulation products of the instant invention comprising a mineral wool product having glass fibers in intimate and co-mingled relationship with the mineral wool fibers therein.

The mineral wool products to which the invention is specifically directed are those products which are manufactured to specific density, thickness and thermal conductivity standards. A heat curable binder is incorporated in with the fibers during the manufacture of these products by conventional means (not shown) and after this binder has been cured, these products are shape retaining and generally are covered on at least one surface by a vapor resistant paper. The resiliency of these products is such that, after being compressed to about one-third their original thickness for insertion into their shipping container, they will regain eighty percent of their original thickness when removed therefrom. The advantageous results of the instant invention may be obtained by including as little as between about 2 to 6 percent by weight of glass fibers in intimate and comingled relationship with the mineral wool fibers to form the mineral wool batt. However, in some instances it may be desirable to include more glass fibers to obtain differing types of products. The exact reason why these results are obtained by small quantities of glass fibers are not exactly known, but it might be due to the intermixing and felting of the mineral wool and glass fibers in the collection chamber immediately after they have been formed.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. Apparatus for forming a mineral wool product having glass fibers in intimate and co-mingled relationships with the mineral wool fibers therein comprising:
    (a) means defining a collection chamber,
    (b) means adjacent said collection chamber for converting a stream of molten raw material into mineral wool fibers,
    (c) means for transferring said mineral wool fibers into said collection chamber,
    (d) means adjacent said collection chamber for attenuating a plurality of glass filaments into glass fibers, (e) means for discharging said glass fibers into said collection chamber, and
(f) means for intermixing and collecting said mineral wool and glass fibers.

2. Apparatus for forming a mineral wool product having glass fibers in intimate and comingled relationship with the mineral wool fibers therein comprising:
 (a) means defining a collection chamber,
 (b) means adjacent said collection chamber for converting a stream of molten raw material into mineral wool fibers,
 (c) means for transferring said mineral wool fibers into said collection chamber,
 (d) at least one open-ended tube adjacent said collection chamber and having one end thereof opening into said collection chamber,
 (e) means adjacent the other end of said tube for attenuating glass filaments into glass fibers,
 (f) said glass fibers flowing in a fiber stream through said tube and into said collection chamber, and
 (g) means for intermixing and collecting said mineral wool and glass fibers.

3. Apparatus for forming a mineral wool product having glass fibers in intimate and comingled relationship with the mineral wool fibers therein comprising:
 (a) means defining a collection chamber having at least one end wall and two side walls wherein said side walls extend in a direction generally perpendicular to said end wall,
 (b) means adjacent said end wall for converting a stream of molten raw material into mineral wool fibers,
 (c) means for transferring said mineral wool fibers into said collection chamber,
 (d) said mineral wool fibers moving in a direction generally parallel to said side walls,
 (e) means adjacent said collection chamber for attenuating glass filaments into glass fibers,
 (f) means for discharging said glass fibers in a fiber stream moving generally in a direction transverse to the direction of movement of said mineral wool fibers to intermix said mineral wool fibers and said glass fibers, and
 (g) means within said collection chamber for collecting said intermixed mineral wool and glass fibers.

4. Apparatus for forming a mineral wool product having glass fibers in intimate and comingled relationship with the mineral wool fibers therein comprising:
 (a) means defining a collection chamber having at least one end wall and two side walls wherein said side walls extend in a direction generally perpendicular to said end wall,
 (b) means adjacent said end wall for converting a stream of molten raw material into mineral wool fibers,
 (c) means for transferring said mineral wool fibers into said collection chamber,
 (d) said mineral wool fibers moving in a direction generally parallel to said side walls,
 (e) at least one open-ended tube adjacent each side wall of said collection chamber and having one end thereof opening in said collection chamber,
 (f) means adjacent the other end of each of said tubes for attenuating glass filaments into glass fibers,
 (g) said glass fibers flowing in fiber streams through said tubes into said collection chamber,
 (h) said fiber streams moving generally in directions transverse to the direction of movement of said mineral wool fibers to intermix said mineral wool fibers and said glass fibers, and
 (i) means within said collection chamber for collecting said intermixed mineral wool and glass fibers.

5. Apparatus for forming a mineral wool product having glass fibers in intimate and comingled relationship with the mineral wool fibers therein comprising:
 (a) means defining a collection chamber having at least one end wall and two side walls wherein said side walls extend in a direction generally perpendicular to said end wall,
 (b) means adjacent said end wall for converting a stream of molten raw material into mineral wool fibers,
 (c) means for transferring said mineral wool fibers into said collection chamber,
 (d) said mineral wool fibers moving in a direction generally parallel to said side walls,
 (e) a plurality of open-ended tubes adjacent each side wall of said collection chamber,
 (f) each of said tubes having one end thereof opening into said collection chamber,
 (g) means adjacent the other end of each of said tubes for attenuating glass filaments into glass fibers,
 (h) said glass fibers flowing in fiber streams through said tubes into said collection chamber,
 (i) said fiber streams moving generally in directions transverse to the direction of movement of said mineral wool fibers to intermix said mineral wool fibers and said glass fibers, and
 (j) means within said collection chamber for collecting said intermixed mineral wool and glass fibers.

6. A method of improving felted mineral wool products comprising improving their resiliency and regain from compression, said method comprising:
 (a) producing mineral wool fiber from a source of molten mineral material and forming an aeriform suspension of the fiber with an air current carrying the air suspended mineral fiber to a collection means;
 (b) producing glass fiber by attenuating glass filaments with a gaseous blast;
 (c) feeding the attenuated glass fiber into the air suspended mineral wool fiber and thereby intermixing and comingling the glass fiber with the air suspended mineral wool fiber; and,
 (d) collecting the mineral wool fiber with the intermixed and comingled glass fiber from the air suspension as a felted mineral wool product of the mineral wool fiber with the glass fiber intermixed and comingled in an intimate interfelted fibrous product.

7. A method of improving felted mineral wool products comprising improving their resiliency and regain from compression, said method comprising:
 (a) producing mineral wool fiber from a source of molten mineral material and forming an aeriform suspension of the fiber with an air current carrying the air suspended mineral fiber to a collection means;
 (b) producing glass fiber of an average length greater than the mineral wool fiber, by attenuating glass filaments with a gaseous blast;
 (c) feeding and interspersing the longer attenuated glass fiber into the air suspended mineral wool in a proportion of glass fiber smaller than the proportion of mineral wool fiber, and thereby intermixing and comingling the longer glass fiber with the air suspended mineral wool fiber; and,
 (d) collecting the mineral wool fiber with the intermixed and comingled glass fiber from the air suspension as a felted mineral wool product of the mineral wool fiber with the glass fiber intermixed and comingled in an intimate interfelted fibrous product.

8. A method of improving felted mineral wool products comprising improving their resiliency and regain from compression, said method comprising:
 (a) producing mineral wool fiber from a source of molten mineral material and forming an aeriform suspension of the fiber with an air current carrying the air suspended mineral fiber to a collection means;
 (b) producing glass fiber of an average length greater than the mineral wool fiber, by attenuating glass filaments with a gaseous blast;
 (c) feeding and interspersing the longer attenuated glass fiber into the air suspended mineral wool and intercepting the glass fibers with the air suspension of mineral wool, the direction of feed of the glass fiber into the said air suspension of mineral wool being in a direction generally transverse to the direction of the movement of the air suspension of mineral wool fiber being carried to the collection means, and the proportion of glass fiber being fed to the mineral wool fiber being smaller than the proportion of the mineral wool fiber, thereby intermixing and comingling the longer glass fiber with the air suspended mineral wool fiber; and (d) collecting the shorter mineral wool fiber with the transversely intermixed and comingled longer glass fiber from the air suspension as a felted mineral wool product of the shorter mineral wool fiber with the longer glass fiber intermixed and comingled in an intimate interfelted fibrous product.

References Cited

UNITED STATES PATENTS

| | | | |
|---|---|---|---|
| 2,528,091 | 10/1950 | Slayter | 161 |
| 2,747,994 | 5/1956 | Hoopes | 161—169 X |
| 2,904,453 | 9/1959 | Labino | 161—170 X |

DONALL H. SYLVESTER, *Primary Examiner.*

R. L. LINDSAY, *Assistant Examiner.*